(12) United States Patent
Kocher (10) Patent No.: US 10,896,597 B1
(45) Date of Patent: Jan. 19, 2021

(54) ALERT AND RESPONSE HELMET SYSTEM

(71) Applicant: Robert William Kocher, McLean, VA (US)

(72) Inventor: Robert William Kocher, McLean, VA (US)

( * ) Notice: Subject to any disclaimer, the term of this patent is extended or adjusted under 35 U.S.C. 154(b) by 0 days.

(21) Appl. No.: 16/501,430

(22) Filed: Apr. 15, 2019

Related U.S. Application Data (60) Provisional application No. 62/762,076, filed on Apr. 19, 2018.

(51) Int. Cl.
| | |
|---|---|
| *G08B 1/08* | (2006.01) |
| *G08B 25/01* | (2006.01) |
| *G08B 15/02* | (2006.01) |
| *G06K 9/00* | (2006.01) |
| *A42B 3/30* | (2006.01) |
| *A42B 3/04* | (2006.01) |
| *F41H 13/00* | (2006.01) |
| *F41H 9/10* | (2006.01) |
| *H04N 5/225* | (2006.01) |

(52) U.S. Cl.
CPC .......... *G08B 25/016* (2013.01); *A42B 3/0406* (2013.01); *A42B 3/30* (2013.01); *F41H 9/10* (2013.01); *F41H 13/0012* (2013.01); *G06K 9/00288* (2013.01); *G06K 9/00617* (2013.01); *G06K 9/00671* (2013.01); *G08B 15/02* (2013.01); *H04N 5/2256* (2013.01)

(58) Field of Classification Search
CPC .... G08B 25/016; G08B 15/02; A42B 3/0406; A42B 3/30; F41H 9/10; F41H 13/0012; G06K 9/00288; G06K 9/00617; G06K 9/00671; H04N 5/2256
USPC ........................................................ 340/539.1
See application file for complete search history.

(56) References Cited

U.S. PATENT DOCUMENTS

| | | | | |
|---|---|---|---|---|
| 7,399,100 | B1 * | 7/2008 | Plyaskin | F41G 1/35 362/110 |
| 2005/0134439 | A1 * | 6/2005 | Moore | A42B 3/0453 340/432 |
| 2005/0275193 | A1 * | 12/2005 | Lee | B60Q 1/2676 280/468 |
| 2008/0068825 | A1 * | 3/2008 | Harris | A42B 3/0406 362/105 |
| 2008/0174990 | A1 * | 7/2008 | Tuck | F21L 4/005 362/198 |
| 2009/0290022 | A1 * | 11/2009 | Uhm | G08B 13/19647 348/148 |

(Continued)

*Primary Examiner* — Zhen Y Wu (57) ABSTRACT

An alert and response helmet system for temporarily disabling in a non-lethal manner in order to take a wanted individual into custody without placing the life of an officer in danger, the alert and response helmet system including; a pair of glasses to be worn by the officer; the glasses including a camera which photographs an individual and obtains facial and or an iris scan of the individual. The glasses further including an earphone and a communication device which communicates with the officer. A processor processes the camera image and a database provides information relating to whether the processed images correspond to a wanted individual. A helmet worn by the officer includes a non-lethal but temporarily disabling device which causes a wanted individual to be temporarily disabled to give the officer time to draw their weapon before the wanted individual can draw a weapon.

9 Claims, 7 Drawing Sheets

(56) References Cited

U.S. PATENT DOCUMENTS

| | | | |
|---|---|---|---|
| 2009/0303698 A1* | 12/2009 | Huss | A42B 3/044 362/105 |
| 2010/0090026 A1* | 4/2010 | Pearson | F41H 9/10 239/304 |
| 2011/0216948 A1* | 9/2011 | Yalla | G06K 9/00 382/125 |
| 2013/0093585 A1* | 4/2013 | Ambani | A42B 3/306 340/475 |
| 2013/0194784 A1* | 8/2013 | Yu | F21V 21/145 362/108 |
| 2013/0291290 A1* | 11/2013 | Bernier | A42B 3/04 2/422 |
| 2014/0334138 A1* | 11/2014 | Jigamian | F21L 4/005 362/157 |
| 2015/0040456 A1* | 2/2015 | Zimmer | F41G 1/02 42/90 |
| 2015/0250247 A1* | 9/2015 | Beckers | A42B 3/044 2/422 |
| 2015/0256990 A1* | 9/2015 | Vilrokx | H04W 76/50 455/404.1 |
| 2015/0309316 A1* | 10/2015 | Osterhout | G06F 3/0346 345/8 |
| 2016/0003460 A1* | 1/2016 | Li | F21V 21/34 362/191 |
| 2016/0027292 A1* | 1/2016 | Kerning | G08B 25/016 455/404.2 |
| 2016/0097614 A1* | 4/2016 | Manly | F16B 21/186 42/90 |
| 2018/0093638 A1* | 4/2018 | Piccioni | H02J 7/025 |
| 2018/0132555 A1* | 5/2018 | Gonzalez | A42B 3/0453 |
| 2019/0122516 A1* | 4/2019 | Lorenzetti | H04N 5/772 |
| 2019/0286901 A1* | 9/2019 | Blanco | G06K 9/00536 |
| 2020/0000167 A1* | 1/2020 | Noordzij | A42B 3/044 |

* cited by examiner

ALERT AND RESPONSE HELMET SYSTEM

CROSS-REFERENCE TO RELATED APPLICATIONS

This application claims priority from U.S. Provisional Patent Application Ser. No. 62/762,076, filed on Apr. 19, 2018, titled Alert & Response Helmet System. The contents of the US Provisional Patent Application are incorporated herein, in their entirety.

BACKGROUND

Field of the Invention

This invention relates to an alert and response helmet which provides a non-lethal and temporary disablement of an individual on a watchlist for purposes of taking the wanted individual into custody.

Description of the Related Art

There are individuals who are wanted by federal, state and local authorities, Interpol, etc. These individuals are placed on a "Watchlist" so they can be identified, apprehended and taken into custody when they are located by the police, our armed forces, etc. This is conventionally done by the officer or soldier (hereinafter "officer") identifying, locating and arresting the wanted individual. However, because the wanted individuals are generally dangerous criminals and/or terrorists, the problem arises that the wanted individual may be prepared to react quickly to an attempt to arrest them. They might have a firearm or knife, bomb, etc. within reach, or may be aware of a bystander nearby that they may be able to grab to use as a hostage, in order to try to get the officer or soldier to let them go or otherwise resist arrest. Or, they may threaten to kill the hostage or hostages unless the officer lowers their weapon. If the officer complies with the demand from the wanted individual, the wanted individual may immediately shoot the officer along with the hostage or hostages. Thus, a need arises for a system that will allow the office to temporarily and in a non-lethal manner, disable the wanted individual and take the individual into custody without the wanted individual having the ability to take control of the situation and avoid arrest. It is also important to do this in a manner that will greatly minimize the risk of injury or death to the officer, hostage or hostages as well as any bystanders.

SUMMARY OF THE EXEMPLARY EMBODIMENTS

It is an object of the invention to provide an alert and response helmet system that includes glasses that will take facial and/or iris images of individuals approaching or within sight of the officer, and identify, through a processor, whether the image or images correspond to someone on a watch list. In addition to capturing both or either facial and iris images of the individual suspect, the camera is connected to or in communication with a database having a wanted list of individuals wanted by the police, federal government, Interpol, etc. Upon identification of an individual on the wanted list, the officer is notified by a voice communication or other sound or communication that will let the officer know that the individual needs to be taken into custody.

The glasses are connected to the processor and a database of wanted individuals. The processor will identify wanted individuals. The invention also includes a helmet worn by the officer. The danger at this point is that wanted individuals, especially when approaching police officers or members of the military, such as when trying to enter federal buildings, etc., will likely be armed and ready to harm or kill the officer, bystanders and people taken as hostages, when confronted. This raises the risk of the wanted individual pulling out a weapon before the officer can and shooting the officer or grabbing someone nearby as a hostage or harming one or more bystanders. To prevent this scenario, the helmet worn by the officer has the device that can temporarily and in a non-lethal manner, disable the wanted individual. This is performed by mounting the non-lethal device, such as a high-powered photographic flash, a pepper spray, a stun gun, flash grenade, etc. that will temporarily stun the wanted individual so the officer has time to draw his or her weapon and take the wanted individual into custody before the wanted individual can draw their weapon and shoot the officer, grab a hostage or shoot a bystander. The flash, pepper spray, stun gun etc., will come forth from the helmet or can be mounted on the body of the officer, or both mounted on the body of the officer and the officer's helmet. The weapon is triggered by a trigger mechanism at the side of the officer or perhaps inside a top layer of the officer's apparel so that the trigger is easily within reach without attracting attention of the wanted individual. In addition, the processor and wanted list database are hidden in the clothing of the officer but could be located elsewhere, as would be understood by one of ordinary skill in the art. Similarly, the helmet may contain one or more of the non-lethal weapons while the stun gun may be attached to the officer's clothing.

In one exemplary embodiment, an alert and response helmet system is provided for temporarily disabling in a non-lethal manner in order to take a wanted individual into custody without placing the life of an officer in danger. The alert and response helmet system includes a pair of glasses to be worn by the officer. The glasses include a camera which photographs an individual and obtains at least a facial image of the individual. The glasses further including an earphone and communication device which communicates to the officer that the individual needs to be taken into custody. A processor is provided which processes the camera image and a database which provides information to the processor which determines whether the image corresponds to a wanted individual. A helmet is provided which is configured to be worn by the officer. The helmet includes a non-lethal but temporarily disabling device such as a pepper spray or a high-powered photographic flash mounted on the helmet and which is directed to a wanted individual to cause a wanted individual to be temporarily disabled by the flash in order to give the officer time to draw their weapon before the wanted individual can draw a weapon. A trigger is provided on the officer's clothing to enable the officer to launch the non-lethal device at the wanted individual because upon identification of a wanted individual, the processor communicates with the officer through the communication device and earphones in the glasses that the individual is on a wanted list and needs to be taken into custody.

In another exemplary embodiment, the glasses communicate with the officer through voice instructions or through the sound of a dog or bird or in a similar fashion.

In another exemplary embodiment, the helmet includes a stun gun as the non-lethal device and can be used with the pepper spray and/or the high-powered photographic flash.

In another exemplary embodiment, the stun gun may be mounted on the body of the officer instead of on the helmet.

According to an exemplary embodiment, an alert and response helmet system for temporarily disabling or disrupting in a non-lethal manner in order to take a wanted individual into custody without placing the life of an officer in danger, is provided. The alert and response helmet system includes: a pair of glasses to be worn by the officer; the glasses including: a camera which photographs an individual and obtains at least a facial scan of the individual; the glasses further including an earphone and a communication device which communicates with the officer that the photographed individual needs to be taken into custody; a processor which processes the camera image or images and a database which provides information to the processor which determines whether the image corresponds to a wanted individual; a helmet configured to be worn by the officer; the helmet including; a non-lethal device mounted on the helmet which is directed to a wanted individual to cause a wanted individual to be temporarily disabled to give the officer time to draw their weapon before the wanted individual can draw a weapon; wherein upon identification of a wanted individual, the processor communicates with the officer through the communication device in the glasses that the individual is on a wanted list and needs to be taken into custody; and a trigger attached to the officer's clothing, allowing the officer to trigger the non-lethal disrupting or disabling device at the wanted individual.

DRAWING REFERENCE NUMERALS

1 Alert and Response Helmet System
2 Eyeglasses
3 Eyeglass earphones and communicator
4 Connection between the processor and the eyeglasses
5 Helmet
6 Officer
7 Non-lethal device for disabling or disrupting wanted individual
8 Connection between the processor 9 and each of the non-lethal devices, the eyeglass earphone and the eyeglass communicator
9 Processor
10 Trigger
11 High-power photograph flash lamp as the non-lethal device.
12 Pepper spray device as the non-lethal device
13 Flash grenade as the non-lethal device
14 Helmet mounted stun gun as the non-lethal device
15 Camera
16 Connection between the trigger and the non-lethal device
17 Body-mounted stun gun

DETAILED DESCRIPTION OF THE EXEMPLARY EMBODIMENTS

Figure 1:
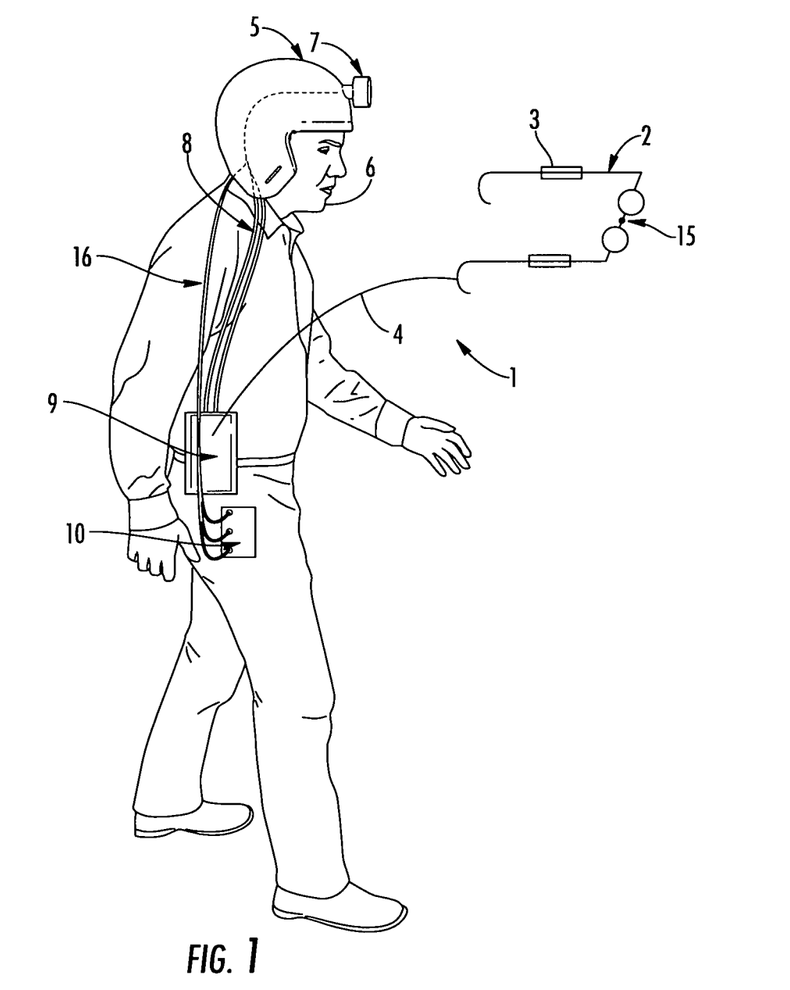
FIG. 1 illustrates a side view of one exemplary embodiment of an alert and response helmet.

FIG. 1 depicts a first exemplary embodiment of the claimed alert and response helmet system. This exemplary embodiment of the invention provides an alert and response helmet and glasses that will identify wanted individuals and temporarily, and in a non-lethal manner, disable the wanted individual so that they can be taken into custody without endangering or risking the life of the officer, bystanders and/or hostages. The invention includes a helmet worn by the officer. The officer also wears a pair of glasses that will provide facial and/or iris identification of an approaching individual or an individual being observed by the officer. In addition to capturing both or either facial and iris images of the individual, the camera is connected through a processor for communication with a database having a "wanted list" of individuals wanted by the police, Federal government, Interpol, etc. Upon identification of an individual on the wanted list, the officer is notified by the system through a voice communication or other sound or communication that will let the officer know that the individual needs to be taken into custody.

The danger at this point is that wanted individuals, especially when approaching police officers or members of the military, such as when trying to enter federal buildings, etc., will likely be armed and ready to harm the officer, potential hostages and/or bystanders when confronted. This raises the risk of the wanted individual pulling out a weapon before the officer can and shooting the officer or grabbing a nearby individual as a hostage. To prevent this scenario, the helmet worn by the officer has a device that can temporarily and in a non-lethal manner, disable the wanted individual. This is performed by mounting the non-lethal device, such as a highly intense photographic flash, a pepper spray, a stun gun, flash grenade, etc. that will temporarily disable or distract the wanted individual so the officer has time to draw his or her weapon and take the wanted individual into custody before the wanted individual can draw their weapon and shoot the officer or grab a nearby person hostage. The high-powered photograph flash from the light, pepper spray, stun gun etc., will come forth from the helmet. The weapon is triggered by a trigger mechanism at the side of the officer or perhaps inside a top layer of the officer's apparel so that the trigger is easily within reach without attracting the attention of the wanted individual. In addition, a processor and wanted list database is hidden in the clothing but could be located elsewhere, as would by one of ordinary skill in the art. Similarly, the helmet may contain one or more of the non-lethal weapons while the stun gun may be attached to the officer's clothing or to the officer's helmet.

As illustrated in FIG. 1, numeral 1 represents a first exemplary embodiment of the invention. Glasses 2 are to be worn by the officer 6. The glasses include an earphone and communicator 3 on each side of the glasses 2 and camera 15. Camera is illustrated as being in the center of the glasses, but could be at different locations on the glasses as would be understood by one of ordinary skill in the art. Element 5 represents the alert and response helmet which is worn by the officer 6. A non-lethal but temporarily disabling device 7 is mounted on the front of the helmet above the face of the officer, but can be located elsewhere, as would be understood by one of ordinary skill in the art. A processor 9 is illustrated as being mounted on the side of the officer's body; but is preferably worn inside of the officer's clothing so as not to be visible. The processor 9 is in communication with the eyeglasses 2 through a communication line, illustrated as 4. The camera 15 and the earphone and communicator 3 communicate with the processor 9 so that the processor can process image data from the camera in order to identify wanted individuals from a wanted individuals' database located within the processor. When the processor 9 identifies an image of a wanted individual, the processor 9 communicates with the officer 6 via communication line 8, where the officer is advised, by voice or through some other sounds such as a barking dog or bird, etc. that the individual is wanted and needs to be taken into custody. The officer then taps trigger 10 which launches the high-powered photographic flash or pepper spray or a stun gun, etc. from the non-lethal but temporarily disabling or distracting device 7. The trigger 10 is connected to the non-lethal disabling device by communication line 16 which may be a cable. All or most of the communication lines may alternatively be wireless. The disabling device 7 gives the officer the time needed to draw his weapon and take the wanted individual into custody without the wanted individual having time to draw their own weapon or grab a passerby to be used as a hostage.

Figure 2:
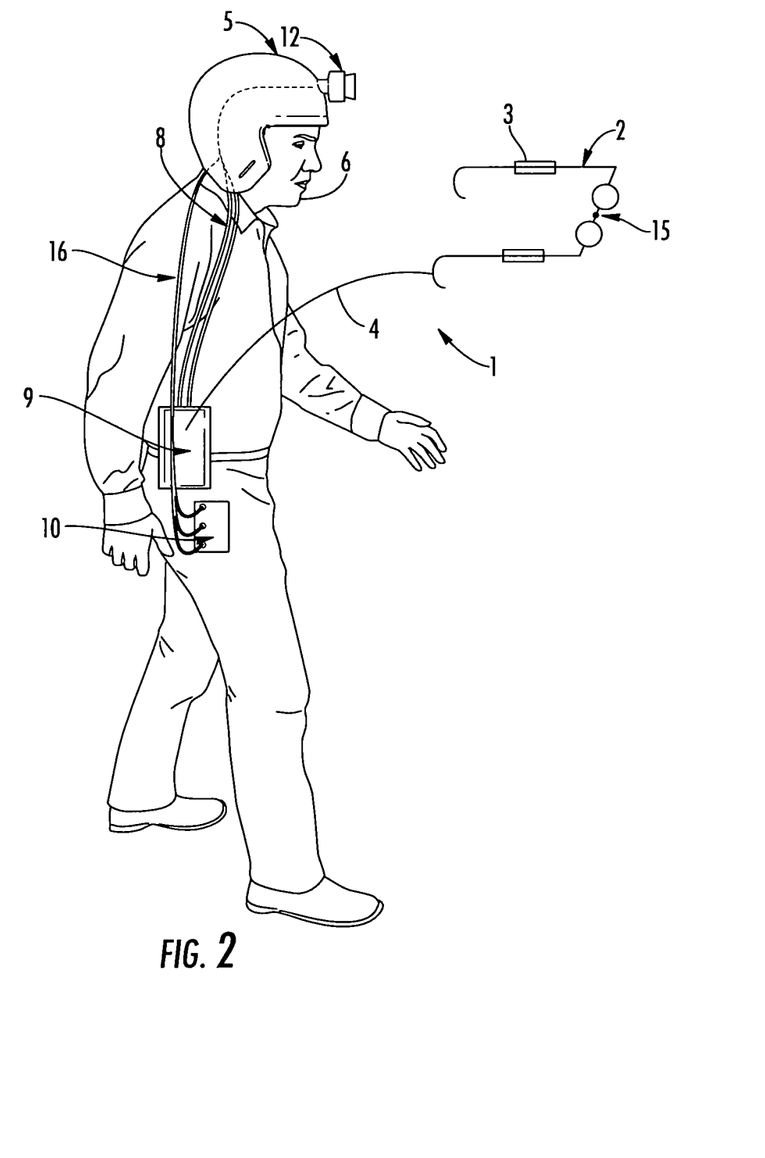
FIG. 2 illustrates a front view of another exemplary embodiment of an alert and response helmet.

FIG. 2 represents another exemplary embodiment of the claimed alert and response helmet system. In this exemplary embodiment, the non-lethal, but temporarily disabling device is a pepper spray 12.

Figure 3:
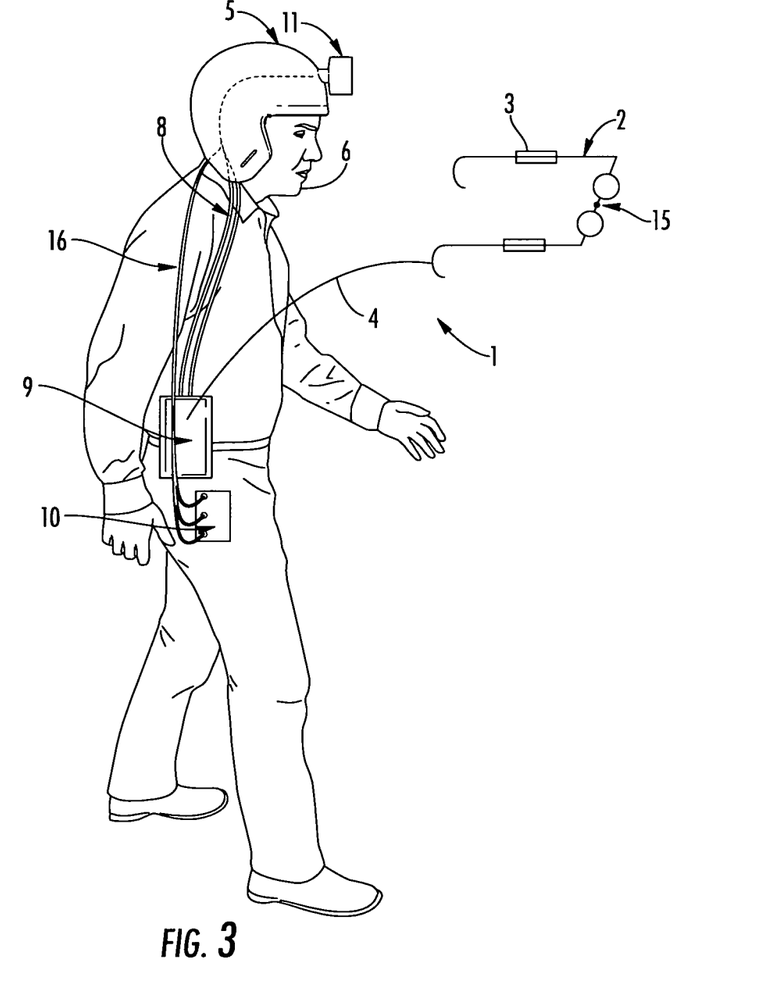
FIG. 3 illustrates a front view of yet another exemplary embodiment of an alert and response helmet.

FIG. 3 represents another exemplary embodiment of the claimed alert and response helmet system. In this exemplary embodiment, the non-lethal, but temporarily disabling device is a high-powered photographic flash 11, such as a flash bulb that is used by photographers.

Figure 4:
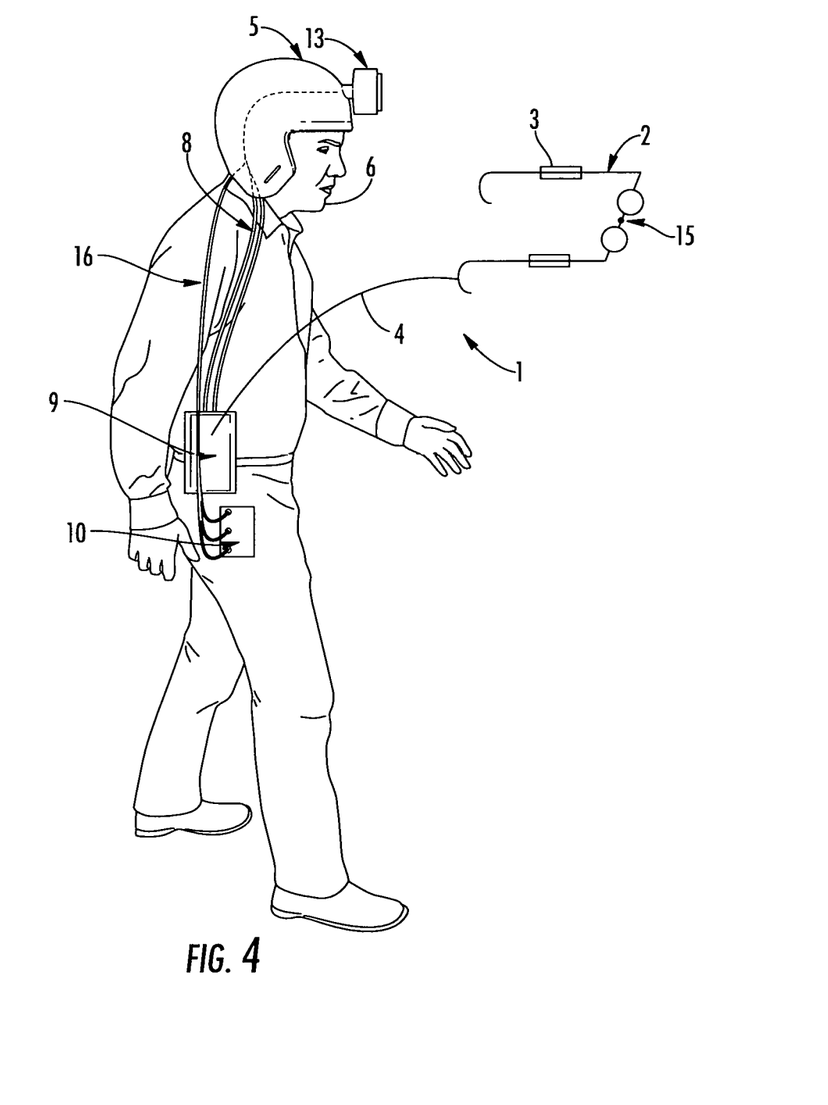
FIG. 4 illustrates a front view of yet another exemplary embodiment of an alert and response helmet.

FIG. 4 represents another exemplary embodiment of the claimed alert and response helmet system. In this exemplary embodiment, the non-lethal, but temporarily disabling or distracting device is a flash grenade 13.

Figure 5:
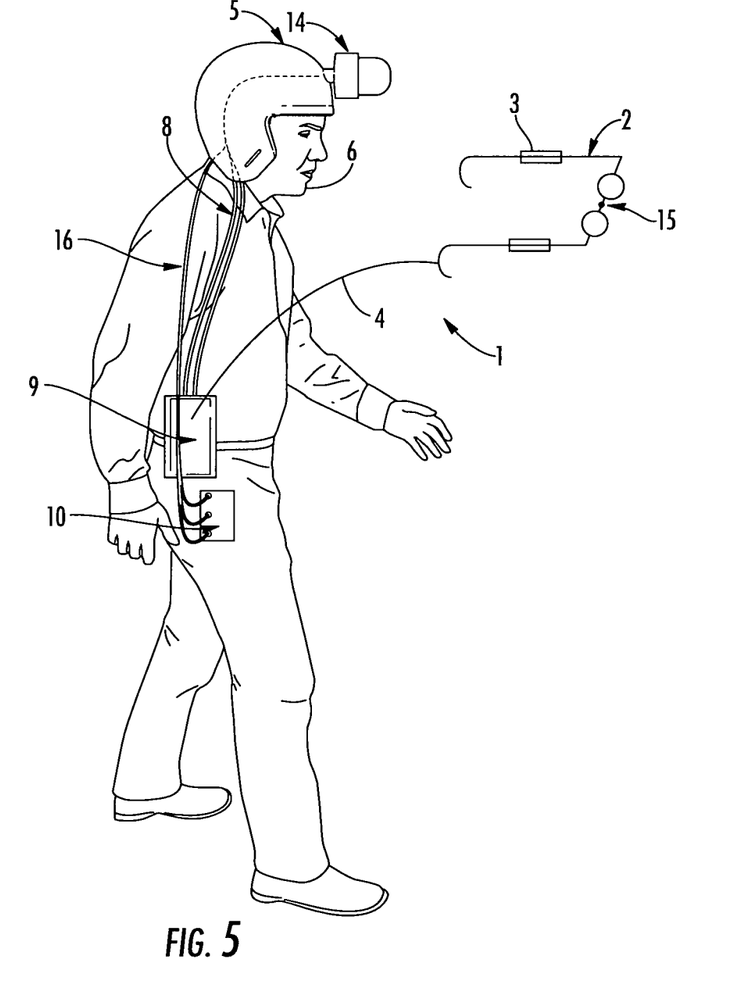
FIG. 5 illustrates a front view of yet another exemplary embodiment of an alert and response helmet.

FIG. 5 represents another exemplary embodiment of the claimed alert and response helmet system. In this exemplary embodiment, the non-lethal, but temporarily disabling device is a stun gun, Taser® or similar device 14.

Figure 6:
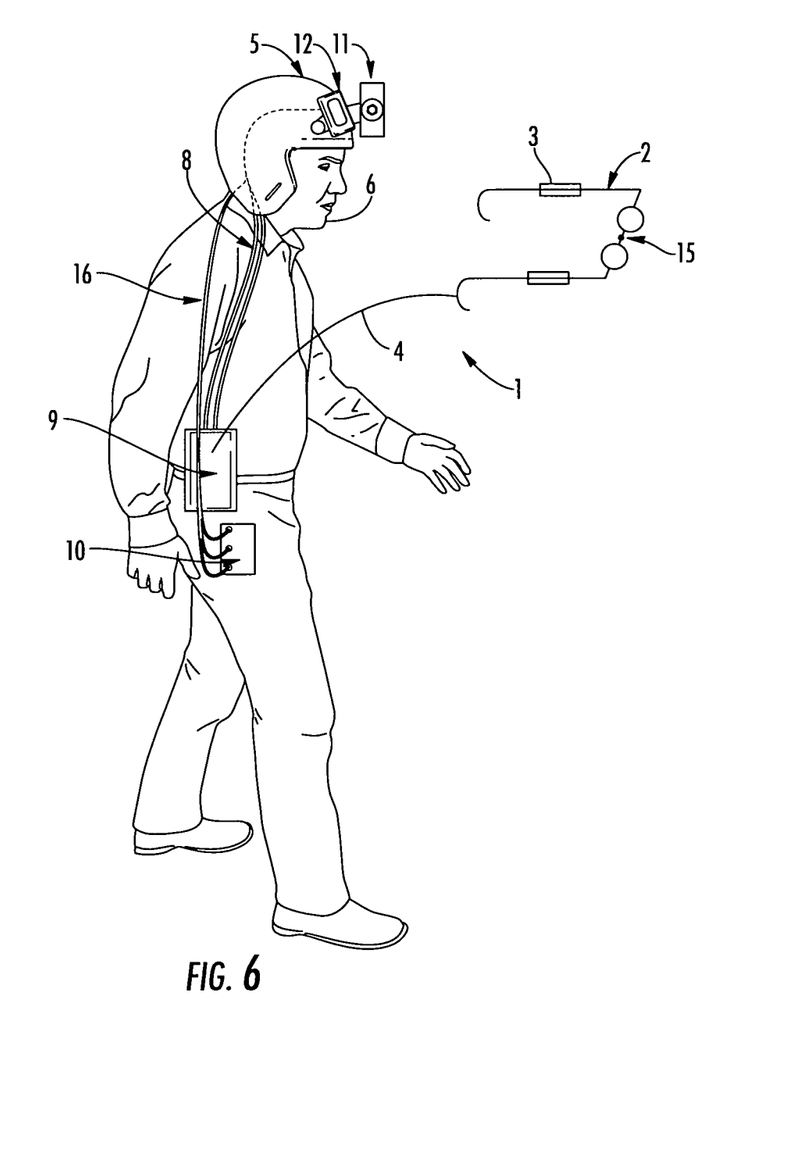
FIG. 6 illustrates a front view of yet another exemplary embodiment of an alert and response helmet.

FIG. 6 represents another exemplary embodiment of the claimed alert and response helmet system. In this exemplary embodiment, the non-lethal, but temporarily disabling device is a both a pepper spray 12 and a high-powered photographic flash 11. In this situation, both of the pepper spray and the high-powered photographic flash can be used by tapping the trigger 10 twice, or the trigger 10 can have two different areas to tap, (not shown).

Figure 7:
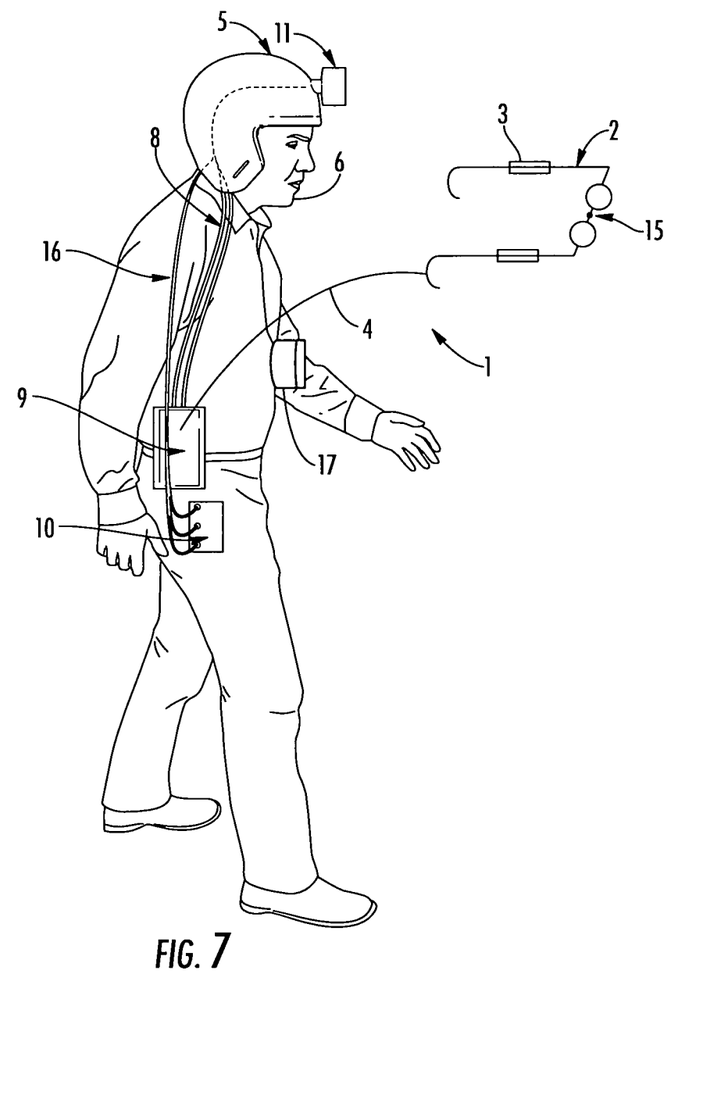
FIG. 7 illustrates a front view of yet another exemplary embodiment of an alert and response helmet.

FIG. 7 represents another exemplary embodiment of the claimed alert and response helmet system. In this exemplary embodiment, the non-lethal, but temporarily disabling device is both a helmet mounted high-powered photographic flash 11 and a stun gun or Taser® or similar device 17 mounted to the body of the officer, as would be understood by one of ordinary skill in the art.

Although exemplary embodiments have been shown above, other exemplary embodiments can readily be used as would be understood by an artisan. For example, each of the non-lethal but temporarily disabling or distracting devices may be readily interchanged. The exemplary embodiments should not be considered to be limiting of the invention in any way, as the invention is only limited by the scope of the appended claims.

The invention claimed is:

1. An alert and response helmet system which temporarily disables or disrupts, in a non-lethal manner, in order to take a wanted individual into custody without placing the life of an officer in danger, the alert and response helmet system for an officer wearing a helmet and a pair of communication glasses, the system comprising;

the pair of communication glasses worn by the officer including:
  a camera which photographs an individual and obtains at least a facial image of the individual;
  a processor which processes the facial image and a database which provides information to the processor which determines whether the facial image corresponds to the wanted individual; and
  an earphone and a communication device which communicates with the officer that the photographed individual needs to be taken into custody;

the helmet worn by the officer including;
  a non-lethal device mounted on the helmet which is directed to the wanted individual to cause the wanted individual to be temporarily disrupted or disabled to give the officer time to draw a weapon;

wherein upon identification of the wanted individual, the processor communicates with the officer through the communication device in the glasses that the individual is on a wanted list and needs to be taken into custody;

a trigger attached to the officer's clothing, allowing the officer to trigger the non-lethal device to temporarily disrupt or disable the wanted individual; and the non-lethal device is a high-powered photographic flash lamp.

2. The alert and response helmet system of claim 1, wherein the communication device of the communication glasses is in communication with the processor.

3. The alert and response helmet system of claim 2 wherein the communication device of the communication glasses communicates with the officer through voice instructions.

4. The alert and response helmet system of claim 2, wherein the communication device of the communication glasses with the officer at least though the sound of a voice, a bird or a barking dog.

5. The alert and response helmet system of claim 1, wherein the non-lethal device further includes a stun gun which temporarily and non-lethally disables the wanted individual.

6. The alert and response system of claim 1, wherein a stun gun is configured to be mounted at a side of the officer or inside a top layer of the officer's apparel.

7. The alert and response helmet system of claim 1, wherein the camera in the communication glasses photographs a retina of the individual and the retina image is used by the processor along with the facial image to determine whether the individual is on the wanted list.

8. The alert and response helmet system of claim 1, wherein the non-lethal device comprises of two non-lethal devices mounted on the helmet.

9. The alert and response helmet system of claim 8, wherein the two non-lethal devices mounted on the helmet are a pepper spray and the high-powered photographic flash lamp.

* * * * *